United States Patent [19]

Güttinger et al.

[11] Patent Number: 4,642,471

[45] Date of Patent: Feb. 10, 1987

[54] SCATTERED RADIATION SMOKE DETECTOR

[75] Inventors: Hannes Güttinger, Stäfa; Gustav Pfister, Uetikon, both of Switzerland

[73] Assignee: Cerberus AG, Männedorf, Switzerland

[21] Appl. No.: 606,828

[22] PCT Filed: Oct. 5, 1983

[86] PCT No.: PCT/CH83/00111

§ 371 Date: Apr. 16, 1984

§ 102(e) Date: Apr. 16, 1984

[87] PCT Pub. No.: WO84/01650

PCT Pub. Date: Apr. 26, 1984

[30] Foreign Application Priority Data

Oct. 11, 1982 [CH] Switzerland .......................... 5944/82

[51] Int. Cl.⁴ ............................................ G01N 21/53

[52] U.S. Cl. ...................................... 250/574; 250/564

[58] Field of Search ............... 250/564, 565, 573, 574; 356/432

[56] References Cited

U.S. PATENT DOCUMENTS 4,397,557 8/1983 Herwig et al. ...................... 250/574

FOREIGN PATENT DOCUMENTS 8100636 3/1981 European Pat. Off. .

0031096 7/1981 European Pat. Off. .

2331533 1/1974 Fed. Rep. of Germany .

2630632 1/1977 Fed. Rep. of Germany .

*Primary Examiner*—Gene Wan

*Attorney, Agent, or Firm*—Werner W. Kleeman

[57] ABSTRACT

In a scattered radiation smoke detector (D) the energy supply from the evaluation unit (A) and the signal returned thereto take place exclusively optically by means of radiation conducting elements ($L_1$, $L_2$) and all electrical components are situated in the evaluation unit (A) remote from the smoke detector (D). An approximately parallel transmitting or reception zone of small diameter is generated by collimating devices (4, 6) disposed at the ends (3, 8) of the optical conductors and thereby the interference radiation level in the smoke detector is reduced and the sensitivity increased. Since the smoke detector (D) comprises no metallic components, it is insensitive to temperature and corrosion and is especially well suited for application in environments subject to the danger of explosion and electrical interference.

40 Claims, 7 Drawing Figures

SCATTERED RADIATION SMOKE DETECTOR

CROSS REFERENCE TO RELATED CASE

This application is related to the commonly assigned, copending U.S. application Ser. No. 06/606,827, filed Apr. 16, 1984, entitled "PHOTOELECTRIC SMOKE DETECTOR AND IT'S APPLICATION", and listing as the inventor HANNES GÜTTINGER et al.

The present invention broadly relates to a smoke detection systems and, more specifically, pertains to a new and improved scattered radiation smoke detector.

Generally speaking, the smoke detection system of the present invention employs a scattered radiation smoke detector for generating an alarm signal in response to detection of smoke and comprises an electronic evaluation circuit. The electronic evaluation circuit comprises means for generating the alarm signal in response to electromagnetic radiation scattered by smoke and also comprises means for emitting electromagnetic radiation. At least one radiation conducting element conducts the scattered radiation smoke detector to the evaluation circuit. The electromagnetic radiation emitted by the electronic evaluation circuit is radiated into a measuring volume. At least one radiation conducting element is provided through which said electromagnetic radiation is radiated into said measuring volume. At least one radiation conducting element is provided by which the electromagnetic radiation scattered from smoke particles in the measuring volume is received and transmitted back to the electronic evaluation circuit.

In other words, the smoke detection system of the present invention is of the type comprising a scattered radiation smoke detector containing a measuring volume, an evaluation circuit having means for emitting electromagnetic radiation as well as means for generating an alarm signal upon detecting presence of smoke in the measuring volume and at least one optical conductor pair connecting the evaluation circuit to the scattered radiation smoke detector.

In a further embodiment, the present invention relates to a scattered radiation smoke detector comprising an electronic evaluation circuit and a plurality of electromagnetic radiation conducting elements for connecting the electronic evaluation circuit to the smoke detector. The electronic evaluation circuit comprises means for emitting electromagnetic radiation. The scattered radiation smoke detector also comprises a measuring volume. At least one first electromagnetic radiation conductor of the plurality of electromagnetic radiation conductors serves for radiating the electromagnetic radiation emitted by the means into the measuring volume and at least one second electromagnetic radiation conducting element of the plurality of electromagnetic radiation conducting elements serves for receiving and conducting back to the electronic evaluation circuit electromagnetic radiation scattered by smoke particles in the measuring volume.

The invention relates to a scattered radiation smoke detector which can be connected to an evaluation unit by means of radiation conducting elements and in which the electromagnetic radiation transmitted from the evaluation unit is beamed into a measuring volume through at least one radiation conductive element and electromagnetic radiation scattered by smoke particles in the measuring volume are received by at least one radiation conducting element and transmitted back to the evaluation unit.

In heretofore known scattered radiation smoke detectors, such as are known from U.S. Pat. No. 4,181,439 or Patent Cooperation Treaty Application WO No. 80/01326, electromagnetic radiation, which is to be understood to include visible light, infrared radiation or ultraviolet radiation, is radiated into an extensive measuring volume by a light emitting diode (LED) disposed in the interior of the smoke detector and radiation scattered by smoke particles in the direction of a solar cell also disposed in the interior of the smoke detector is received by the solar cell.

For voltage supply and signal transmission the smoke detector is connected to an evaluation unit or central signal station by means of electrically conductive metallic signal conductors.

Due to the metallic conductors and to the electrical circuits present within the smoke detector, at least in the diode control circuit and in the receiver circuit, such smoke detectors cannot be used in regions subject to the danger of explosion without complicated and expensive protection and safety measures. A further disadvantage is the undesirable temperature characteristics of the electrical components which require complicated compensation measures. Under certain environmental conditions there is also the risk of corrosion of metal parts. Certain components are also sensitive to water and moisture. This requires a complicated design and complicated manufacturing processes such as protecting the components with a potting material etc.

These disadvantages can partly be overcome, as for instance is described in Belgian Pat. No. 881,812 or in German patent application No. 3,037,636, by connecting the smoke detector with the evaluation unit by means of radiation conducting elements, also known as optical conductors or fiber optics, and disposing the radiation source as well as the radiation receiver in the evaluation unit. The radiation is transmitted from the evaluation unit to the smoke detector by an optical conductor, is radiated into the measuring volume from the end or exit of this optical conductor in the detector, the scattered radiation from the measuring volume is received by the input of another optical conductor and transmitted by this optical conductor back to the evaluation unit. There are therefore in the actual smoke detector no metallic leads or electrical components, so that explosion safety, temperature insensitivity, moisture insensitivity and corrosion insensitivity are obtained.

A disadvantage of such smoke detectors is the relatively broad radiating character of the emission of the optical conductor, that is its relatively wide aperture angle, as well as the equally broad reception characteristics of the optical conductor receiving the scattered radiation. This has the result that in such smoke detectors only scattered radiation having a relatively wide angle of scattering, i.e. a relatively wide angle between the radiation beamed in and the radiation received, can be evaluated since at smaller angles of scattering a substantial component of the received radiation consists of direct radiation. In particular, the extreme forward scattering at scattering angles close to 0° that are particularly useful for detecting smoke cannot be detected by such smoke detectors. The broad radiating characteristics have furthermore the effect that a large part of the interior wall of the detector is irradiated by direct radiation and partially reflects it, particularly due to dust precipitated on the wall which is hardly to be avoided in the course of operation. This leads to an illumination of the measuring volume and to a level of interference energy which masks any radiation weakly scattered by smoke and renders it indetectable or can initiate a false alarm. Therefore, the illuminating power of the radiation source and with it the power requirements of the smoke detector could not be kept at a desirably low level and complicated and expensive measures were required to avoid dust precipitation and radiation reflection from the interior walls of the detector.

A certain improvement was achieved by providing optical means for concentrating the radiation on a focal line or to a focal point, as is, for instance, described by the publications mentioned above. Since the radiation diverges again beyond the focal line or the focal point, too great a portion of the interior wall is still struck by direct radiation and the level of interference radiation is still undesirably high. If an analogous focussing optical means is also provided ahead of the receiver, a precise adjustment of the impinging radiation at the focal point is required, which complicates manufacturing and increases costs. The adjustment can also deteriorate in the course of time due to the effect of temperature or vibrations so that sensitivity is reduced or lost.

Finally, it is difficult, due to mutual encumbrance, to provide two or more sources of radiation in a detector, which would otherwise be advantageous for distinguishing various types of particles and permitting an intelligent evaluation of signals.

SUMMARY OF THE INVENTION

Therefore, with the foregoing in mind, it is a primary object of the present invention to provide a new and improved construction of a scattered radiation smoke detector which does not exhibit the aforementioned drawbacks and shortcomings of the prior art constructions.

Another and more specific object of the present invention is to eliminate the disadvantages of the prior art devices mentioned above and especially to provide a scattered radiation smoke detector of the previously mentioned type which is not only explosion-proof and insensitive to temperature, moisture and corrosion, but also has an increased sensitivity, a low susceptibility to interference and false alarm, as well as improved reliability even when subject to longer durations of operation and to dust accumulation in difficult environmental conditions.

These objects are realized according to the invention by providing at the radiation beam exit point or at the radiation beam entry point of the radiation conducting elements collimating devices for generating an at least approximately non-divergent radiating or receiving zone (S, E) of small cross-section and arranging and orienting the collimating devices and the radiation conducting elements such that the radiating and receiving zones intersect.

In other words, the scattered radiation smoke detector of the present invention is manifested by the features that the at least two radiation conducting elements each have a radiation exit and a radiation entry and at least two collimating devices are provided each at a associated one of the radiation exits and the radiation entries for generating an appropriate one of an at least approximately non-divergent transmitting zone of small cross-section and an at least approximately non-divergent receiving zone of small cross-section. The radiation conducting elements as well as the collimating devices are arranged and oriented such that the transmitting and receiving zones thereof intersect. The at least two radiation conducting elements define a forward direction in which the electromagnetic radiation is radiated into the measuring volume. The collimating devices are structured and oriented such that the transmitting and receiving zones define at least approximately parallel beams which intersect at acute angles such that each receiving collimating device of the collimating devices receives radiation scattered at an acute angle in the forward direction.

In other words, the smoke detection system of the present invention is manifested by the features that the scattered radiation smoke detector comprises at least one first optical collimator for directing electromagnetic radiation into The measuring volume in a predeterminate direction. The at least one optical conductor pair comprises at least one optical transmission conductor for conducting the electromagnetic radiation from the means for emitting electromagnetic radiation to the at least one first optical collimator. The scattered radiation smoke detector comprises at least one second optical collimator for receiving electromagnetic radiation forward-scattered from smoke within the measuring volume. The at least one optical conductor pair comprises at least one optical reception conductor for conducting the received forward-scattered electromagnetic radiation back to the evaluation circuit. The evaluation circuit comprises means for sensing and evaluating the electromagnetic radiation conducted back for determining a possible presence of smoke in the measuring volume. The at least one first optical conductor defines a radiation zone extending in the predetermined direction and substantially confined to a diameter of less than 3 mm (substantially non-divergent). The at least one second optical conductor defines a forward-scattering reception zone extending at an angle of less than 90° to said predetermined direction and substantially confined to a diameter less than 3 mm (substantially non-divergent). The forward-scattering reception zone intersects the radiation zone within the measuring volume.

A further embodiment of the scattered radiation smoke detector of the present invention is manifested by the features that the at least one first electromagnetic radiation conductor has an electromagnetic radiation exit end. The at least one second electromagnetic radiation conductor has an electromagnetic radiation entry end. A respective optical arrangement is provided at each of the electromagnetic radiation exit end and the electromagnetic radiation entry end. Each optical arrangement comprises a radiation emission collimating device and a radiation reception collimating device. Each optical arrangement defines an at least approximately non-divergent radiation zone of small cross-section and an at least approximately non-divergent reception zone of small cross-section. The at least approximately non-divergent radiation zone of small cross-section and the at least approximately non-divergent reception zone of small cross-section of both optical arrangements mutually intersect in the measuring volume for generating the at least approximately non-detergent radiation zone of small cross-section and the at least approximately non-divergent reception zone of small cross-section.

In other words, this alternate embodiment of the scattered radiation smoke detector is manifested by the features that the scattered radiation smoke detector comprises at least two first optical collimators for directing electromagnetic radiation into the measuring volume in a predetermined direction. The at least two optical conductor pairs comprises at least two optical transmission conductors for conducting the electromagnetic radiation from the means for emitting electromagnetic radiation to each of the at least two first optical collimators. The scattered radiation smoke detector comprise at least two second optical collimators for receiving electromagnetic radiation forward-scattered from smoke within the measuring volume. The at least two optical conductor pairs comprise at least two optical reception conductors for conducting the received forward-scattered electromagnetic radiation back to the evaluation circuit. The evaluation circuit comprise means for sensing and evaluating the electromagnetic radiation conducted back by each of the at least two optical reception conductors for determining a possible presence of smoke in the measuring volume. The at least two first optical collimators define at least two radiation zones extending in the predetermined direction and substantially confined to diameters of less than 3 mm (substantially non-divergent). The at least two second optical collimators define at least two forward-scattering reception zones each extending at an angle of less than 90° to the predetermined direction and substantially confined to diameters of less than 3 mm substantially non-divergent. The at least two forward-scattering reception zones intersecting the at least two radiation zones within the measuring volume.

A further embodiment of the present invention is manifested by the features that the at least one first optical collimator defines a radiation zone having substantially the form of a conical surface of revolution generated about an axis of revolution extending in the predetermined direction and substantially confined to a small thickness; the at least one second optical collimator defining a forward-scattering reception zone having substantially the form of a conoid or conical surface of revolution generated about an axis of revolution extending in the predetermined direction and substantially confined to a small thickness. The radiation zone intersects the forward-scattering reception zone in a substantially circular ring of small diameter within the measuring volume.

The combination of radiation conducting elements with suitable collimating devices permits close limitation of the radiating and receiving zones to parallel beams having diameters of, for example, less than 3 mm in a simple manner without recourse to complicated means such as lasers. In this way, an arrangement can be designed which receives exclusively extreme forward scattered radiation yet practically no direct radiation and is insensitive to slight alterations of adjustment. Since only a tiny spot of the interior wall of the detector is directly illuminated, interfering scattered radiation from this point can be practically entirely eliminated by simple measures, such as small but highly effective radiation traps or apertures. An analogous radiation trap can also be provided in the receiving zone. Neither is it difficult to provide a plurality of radiating and receiving zones.

The scattered radiation smoke detector of the invention, as well as practical and advantageous further embodiments thereof, will now be described in relation to the exemplary embodiments shown in the drawings.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

BRIEF DESCRIPTION OF THE PREFERRED EMBODIMENTS

Figure 1:
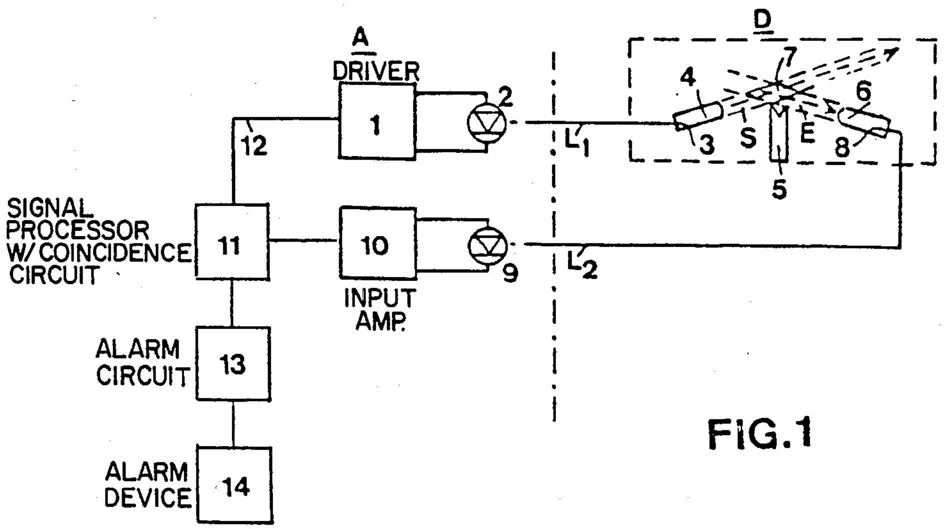
FIG. 1 is a schematic representation of the arrangement of a smoke detector.

Describing now the drawings, it is to be understood that to simplify the showing thereof only enough of the structure of the scattered radiation smoke detector has been illustrated therein as is needed to enable one skilled in the art to readily understand the underlying principles and concepts of this invention. Turning specifically to FIG. 1 of the drawings, the smoke detection system illustrated therein by way of example and not limitation will be seen to comprise, a scattered radiation smoke detector D connected to an evaluation unit or electronic evaluation circuit A by means of radiation conductive elements or optical conductors $L_1$ and $L_2$. While the smoke detector D is disposed at a measuring location of a space to be monitored, the evaluation unit A can be remotely located, if necessary at a distance of more than 100 m. The construction of each optical conductor $L_1$, $L_2$ is advantageously adapted to the radiation employed and can be of the multimode or monomode type. The optical conductors $L_1$ and $L_2$ can consist of a single fiber or of a bundle composed of a plurality of radiation conducting fibers. According to the construction of the smoke detector D, two or more optical conductors $L_1$, $L_2$ may be required for the connection to the evaluation unit. Furthermore, a plurality of smoke detectors D can be connected to the evaluation unit A in parallel through the same optical conductor $L_1$, $L_2$ by means of known gating devices or by means of individual optical conductors on the same input.

In the arrangement shown, a driver circuit 1 provided in the evaluation unit or circuit A regulates a radiation emitting diode (LED) 2 in pulsed operation at 0.1–10 kHz. Its radiation, which according to the type of LED, may be visible, infrared or ultraviolet, is introduced into the optical conductor $L_1$ and transmitted through it to the smoke detector D. A collimating device 4 is disposed at the radiation exit 3 of this optical conductor $L_1$. The collimating device is a special optical device 4 which collimates the radiation emitted from the end of the optical conductor $L_1$ into an at least approximately parallel radiation beam S. A further collimating device 6, shielded from direct radiation by a diaphragm 5, is disposed outside of this radiation beam S and has its reception zone E oriented such that it receives radiation scattered from smoke particles out of a scattering volume 7 and conducts it to a radiation entry 8 of the second optical conductor $L_2$ which, in turn, conducts the received scattered radiation to a solar or photo detection cell 9 in the evaluation unit or circuit A. This solar or photo-detection cell converts the received radiation, i.e. the optical signal, into an electrical signal which is amplified by an input amplifier 10. The output signal of the input amplifier 10 is transmitted to a signal processing circuit 11 which also receives a reference signal from the driver circuit 1 through an electrical conductor 12 and in turn transmits a signal to a subsequent alarm circuit 13 only when the transmitted and received radiation coincide. Alarm circuit 13 activates an alarm device 14 when the scattered radiation signal exceeds a prescribed threshold.

In an evaluation unit realized in practice, the following circuit components were employed:

Driver 1: Oscillator with 555-Timer (Signetics) and 7473 Flip-Flop for generating a square wave voltage at approximately 270 Hz.

LED 2: 2 SE 3352 (Honeywell)

Optical Conductor: QSF 200 A (Quartz et Silice)

Collimator 3, 8: SELFOC SLW 1.8/0.23 P (Nippon Sheet Glass)

Solar or photo detection Cell 9: PIN BPX 65 Siemens)

Input amplifier 10: ICL 7621 (Intersil)

The signal processing circuit 11 can, for instance, be constructed as a coincidence circuit for smoke detectors as known from European Pat. Nos. EP 11,205 or EP 14,779 or can comprise a phase sensitive amplifier (Lock-in amplifier) such as is available from Princeton Applied Research Corporation.

Figure 2:
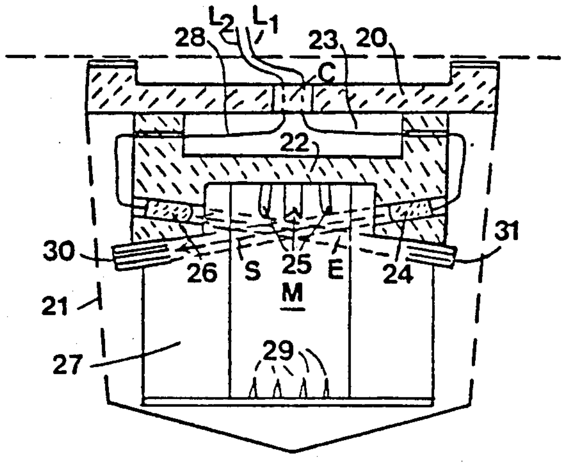
FIG. 2 is a cross-section through a scattered radiation smoke detector.

FIG. 2 shows the construction of a smoke detector D carried out in practice according to the invention in section. A plastic base plate 20 carries an air permeable housing 21 enclosing a measuring chamber M and a carrier element 22 in the interior, also made of a suitable plastic. An optical conductor connection or plug connection C of known type is provided in the base plate 20 and serves to connect the optical conductors $L_1$, $L_2$ coming from the evaluation unit A to the optical conductor connections 23 and 28 situated in the interior of the detector. The two collimating devices 24 and 26 are mounted in recesses in a carrier element 22 and cooperate with the ends of the optical conductor connectors 23 and 28 such that a radiating zone S or receiving zone E with very small aperture angle, i.e. nearly parallel radiation, and a small diameter, i.e. not more than 1 to 3 mm, is produced. A plurality of shields 25 are installed on the central portion of the carrier element 22 for shielding the direct residual radiation from the collimator 26. The optical arrangement corresponds to the diagram of FIG. 1. In order to avoid interference by light penetrating into the measuring chamber M through the housing 21 or by radiation reflected from the interior walls of the housing, the optical arrangement in the interior of the housing 21 is enclosed by an air-permeable but radiation absorbing labyrinthine element 27. This can, for instance, comprise intermeshing fins or be provided with radiation absorbent ribs on its surfaces in order to eliminate the very last interference radiation, for instance that from the edges of the shields 25. A radiation trap 30 of small extent but of particularly good absorption characteristics can be provided to collect the direct radiation emitted from the collimation device 24 and so can an analogous trap 31 at the end of the receiving zone E. Due to the good collimation and the extremely small diameter of the radiation zone S, which were not attainable in heretofore known scattered radiation smoke detectors, the heretofore necessary complicated measures for eliminating interference radiation can in large measure be reduced or omitted in the design described or, on the other hand, the sensitivity of the smoke detector D can be increased and its susceptibility to false alarms reduced. For the same reasons, the optical arrangement can be designed with a smaller scattering angle than heretofore, so that the forward scattering, which is particularly suitable for detecting smoke, can be evaluated, which heretofore was only possible by accepting a higher susceptibility to false alarm and reduced sensitivity. Forward scattering angles under 15° can be attained without complicated shield systems and with suitable shields even scattering angles down to 5°. Further advantages result from the fact that the smoke detector D can be constructed entirely of nonmetallic materials, that is, it is fully explosion-proof, not subject to electromagnetic interference, hardly susceptible to corrosion, also suited for high voltage applications and is furthermore extremely temperature resistant, at least in the range between −50° C. and +150° C. or even considerably higher temperatures if the plastics are replaced by ceramics.

Figure 3:
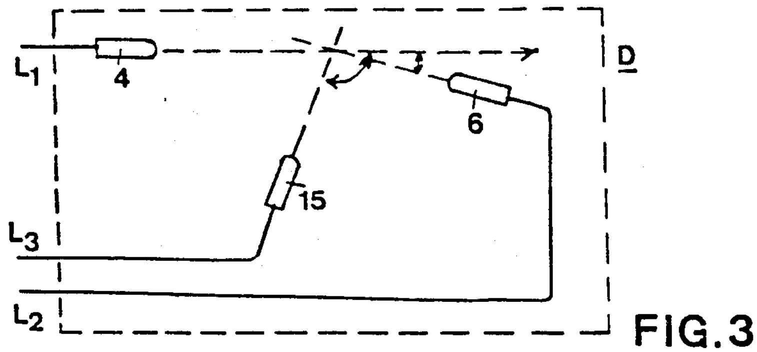
FIG. 3 is a schematic representation of a smoke detector for the evaluation of a plurality of scattering angles.

FIG. 3 shows the diagram of a smoke detector D which, in addition to the components already represented in FIG. 1, comprises a further collimating device 15 which is capable of receiving scattered radiation at a greater scattering angle than the first collimating device 6 and which is connected to the evaluation unit A by a third optical conductor $L_3$. This permits the evaluation of the ratio of scattering at a low scattering angle to scattering at a high scattering angle, which is different for different types of smoke. With a suitable evaluation circuit A it can therefore be determined what type of smoke is actually present. The larger scattering angle can also be chosen greater than 90° so that one collimator receives the forward scattered radiation and the other the backward scattered radiation. A strongly absorbing, i.e. black, smoke can thus be differentiated from a strongly reflecting, i.e. white, smoke.

Figure 4:
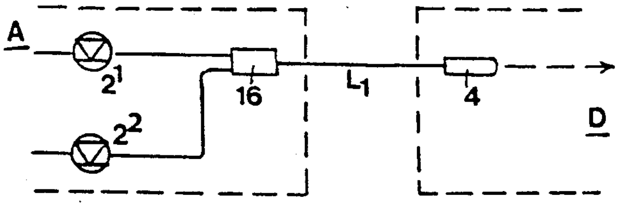
FIG. 4 is a schematic representation of a smoke detector for evaluating a plurality of wavelengths.

In the arrangement shown in FIG. 4, two different LED's $2^1$ and $2^2$ are provided in the evaluation unit A to transmit radiation at two different wavelengths. Both radiation components are gated into the same optical conductor $L_1$ by means of a gating element 16 and transmitted to the collimating device 4. By separate evaluation of the scattered radiation at the two wavelengths, information can be gained about the nature of the scattering medium, particularly about the particle size.

Figure 5:
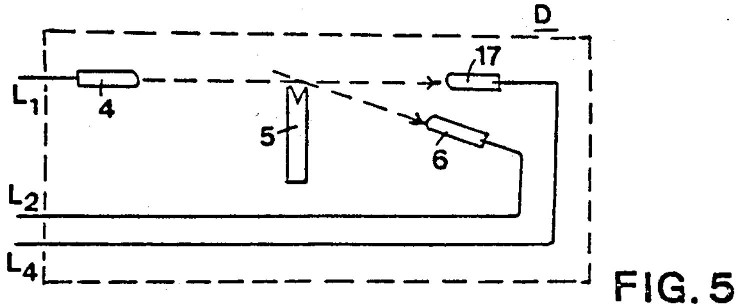
FIG. 5 is a schematic representation of a smoke detector for monitoring radiation.

Smoke detector D according to FIG. 5 comprises a further radiation receiving collimator 17 disposed in the extension of the radiation direction of the collimator 4, and which receives direct radiation and transmits it through a further optical conductor $L_4$ to the evaluation unit A. In this manner the functioning of the LED can be monitored, that is should the radiation fail, a signal will be given or should the intensity of radiation slowly vary, the LED can be regulated.

Figure 6:
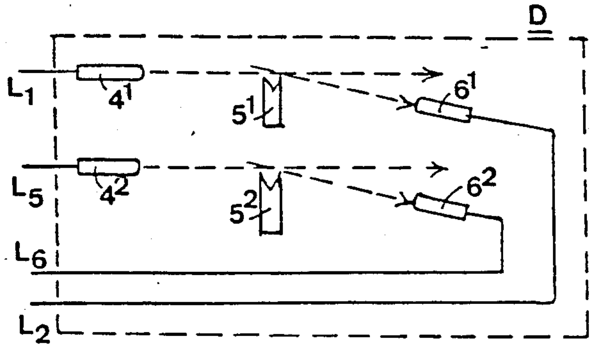
FIG. 6 is a schematic representation of a smoke detector having a plurality of scattering spaces.

In the smoke detector D represented in FIG. 6 a second system or optical arrangement comprising the collimators $4^2$ and $6^2$, the optical conductors $L_5$ and $L_6$ and the shield $5^2$ is disposed in close proximity to a first such system or optical arrangement comprising the collimators $4^1$ and $6^1$, the optical conductors $L_1$ and $L_2$ and the shield $5^1$, to which the second system is analogous. It can be determined by means of a coincidence circuit in the evaluation unit A if scattered radiation is present in both systems simultaneously in order to avoid false alarms.

Figure 7:
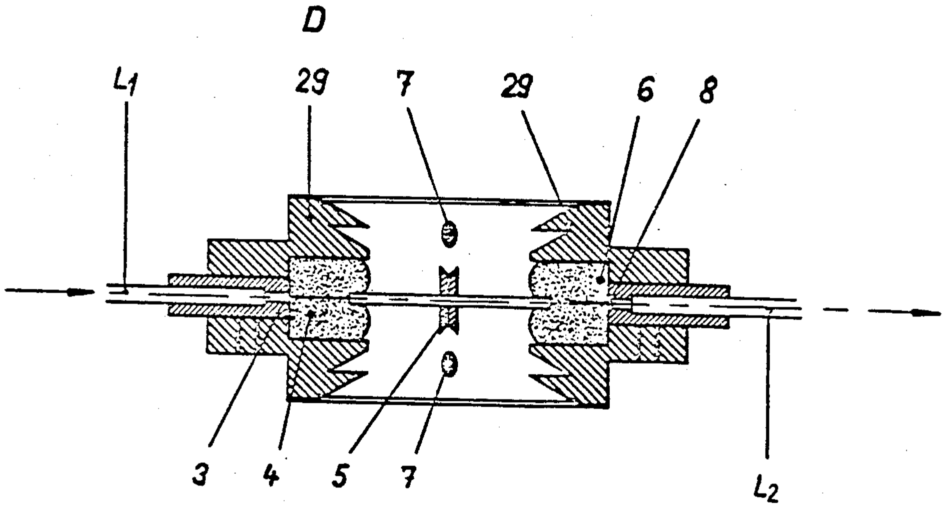
FIG. 7 is a schematic cross-section of a smoke detector having a cone-shaped radiation zone.

The transmitting region S and the receiving region E can be embodied other than as parallel beams of small diameter. FIG. 7 shows an exemplary embodiment of such a smoke detector D. This, like the smoke detector D according to the example of FIG. 1, is connected to an evaluation unit A by two optical conductors $L_1$, $L_2$ and at each of the entries and exits of the optical conductors 3 and 8 collimating devices 4 and 6 are provided. In contrast to the previously described embodiments, these collimating devices 4 and 6 are provided with aspherical surfaces, so that their transmitting or receiving zone has the configuration of a conical shell of small thickness. The radiation intensity or the reception sensitivity is substantially confined to the conical shell and is relatively low outside the shell as well as within the cone in proximity to the axis. The collimating optics are so structured that the aperture angle of radiation in a generatrix of the conical shell is very small, i.e. the thickness of the transmitting or receiving zone varies little along a generatrix. The transmitting and receiving zones intersect in the example shown in a zone 7 having the configuration of a circuit ring or torus of small diameter. In this way similar advantages are obtained as in previously described embodiments having parallel transmitting or receiving zones as long as the divergence of the transmitting and receiving zones, i.e. the variation in thickness of the transmitting and receiving zones, can be kept small in the transmitting or receiving directions. In the embodiment according to FIG. 7, radiation traps 29 are provided for the absorption of direct radiation and for avoiding the reception of background radiation. They are advantageously constructed as circular rings and annularly surround the collimating devices 4 and 6.

While there are shown and described present preferred embodiments of the invention, it is to be distinctly understood that the invention is not limited thereto, but may be otherwise variously embodied and practiced within the scope of the following claims. Accordingly,

What we claim is:

1. A scattered radiation smoke detector for generating an alarm signal in response to detection of smoke, comprising:

an evaluation circuit comprising means for generating an alarm signal in response to electromagnetic radiation scattered by smoke and comprising means for emitting electromagnetic radiation;

at least two radiation conducting elements for connecting the scattered radiation smoke detector to the evaluation circuit;

a measuring volume into which said electromagnetic radiation emitted by said evaluation circuit is radiated;

at least one radiation conducting element through which said electromagnetic radiation is radiated into said measuring volume;

at least one radiation conducting element by which electromagnetic radiation scattered from smoke particles in said measuring volume is received and transmitted back to said evaluation circuit;

said at least one radiation conducting element through which said electromagnetic radiation is radiated into said measuring volume having a radiation exit and said at least one radiation conducting element for receiving said scattered electromagnetic radiation having a radiation entry;

at least two collimating devices provided each at an associated one of said radiation exit and said radiation entry for generating an associated one of an at least approximately non-divergent transmitting zone of small cross-section and an at least approximately non-divergent receiving zone of small cross-section;

said radiation conducting elements as well as said collimating devices being arranged and oriented such that said transmitting and receiving zones thereof intersect;

said at least one radiation conducting element through which said electromagnetic radiation is radiated into said measuring volume defining a forward direction in which said electromagnetic radiation is radiated into said measuring volume; and said at least two collimating devices being structured and oriented such that said transmitting and receiving zones define at least approximately parallel beams which intersect at an acute angle such that one of said at least two collimating device receives radiation scattered at an acute angle in said forward direction.

2. The smoke detector as defined in claim 1, wherein: said acute angle is between 5° and 15°.

3. The smoke detector as defined in claim 1, wherein: said transmitting zone has a diameter not greater than 3 mm.

4. The smoke detector as defined in claim 1, wherein: said receiving zone has a diameter not greater than 3 mm.

5. The smoke detector as defined in claim 1, further including:

at least one shield arranged between said at least two collimating devices;

said at least two collimating devices comprising said one collimating device defining at least one first collimating device for receiving radiation and at least one second collimating device for emitting radiation; and said at least one shield shielding from direct radiation emitted by said at least second collimating device from said at least one first radiation receiving collimating device.

6. The smoke detector as defined in claim 5, further including:

a further collimating device arranged and oriented such that said further collimating device receives scattered radiation at a greater angle of scattering than said at least one first collimating device.

7. The smoke detector as defined in claim 6, wherein: said scattering angle is at least 90°.

8. The smoke detector as defined in claim 1, wherein: said electromagnetic radiation comprises at least two different ranges of wavelength.

9. The smoke detector as defined in claim 8, further including:

a further collimating device arranged in a direct radiation zone.

10. The smoke detector as defined in claim 1, further including:

two optical arrangements;

each optical arrangement of said two optical arrangements comprising one of said at least two collimating devices defining a radiation transmitting collimating device having a transmitting zone and a a further one of said at least two collimating devices defining radiation receiving collimating device having a receiving zone; and said transmitting and receiving zones of said two optical arrangements intersecting in adjacent measuring volumes.

11. The smoke detector as defined in claim 1, wherein:

the emitted electromagnetic radiation has the form of pulses.

12. The smoke detector as defined in claim 12, wherein:

the smoke detector is capable of being connected to said evaluation circuit;

said evaluation circuit comprising a signal-processing circuit for comparing transmitted radiation to received radiation.

13. The smoke detector as defined in claim 12, wherein:

said signal-processing circuit comprises a phase sensitive amplifier.

14. The smoke detector as defined in claim 13, wherein:

said phase sensitive amplifier comprises a lock-in amplifier.

15. The smoke detector as defined in claim 1, wherein:

said radiation zone is terminated by a radiation trap.

16. The smoke detector as defined in claim 15, wherein:

said receiving zone is terminated by a radiation trap.

17. The smoke detector as defined in claim 1, wherein:

said at least two collimating devices are structured such that said transmitting and receiving zones have the form of substantially cone-shaped shells of small thickness which intersect in an annular measuring volume.

18. A smoke detection system, comprising:

a scattered radiation smoke detector containing a measuring volume;

an evaluation circuit having means for emitting electromagnetic radiation and means for generating an alarm signal upon detecting a presence of smoke in said measuring volume;

at least one optical conductor pair connecting said evaluation circuit to said scattered radiation smoke detector;

said scattered radiation smoke detector comprising at least one first optical collimator for directing electromagnetic radiation into said measuring volume in a predetermined direction;

said at least one optical conductor pair comprising at least one optical transmission conductor for conducting said electromagnetic radiation from said means for emitting electromagnetic radiation to said at least one first optical collimator;

said scattered radiation smoke detector comprising at least one second optical collimator for receiving electromagnetic radiation forward-scattered from smoke within said measuring volume;

said at least one optical conductor pair comprising at least one optical reception conductor for conducting said received forward-scattered electromagnetic radiation back to said evaluation circuit;

said evaluation circuit comprising means for sensing and evaluating said electromagnetic radiation conducted back for determining a possible presence of smoke in said measuring volume;

said at least one first optical collimator defining a radiation zone extending in said predetermined direction and being substantially non-divergent;

said at least one second optical collimator defining a forward-scattering reception zone extending at an angle of less than 90° to said predetermined direction and being substantially non-divergent; and said forward-scattering reception zone intersecting said radiation zone within said measuring volume.

19. The smoke detection system as defined in claim 18, wherein:

said angle of less than 90° lies substantially between 5° and 15°.

20. The smoke detection system as defined in claim 18, further including:

shielding means arranged to preclude inadvertent direct irradiation of said at least one second optical collimator by said at least one first optical collimator.

21. The smoke detection system as defined in claim 18, further including:

at least one third optical collimator for receiving scattered electromagnetic radiation and defining a scattering reception zone extending at an angle to said predetermined direction greater than said angle of less than 90°; and a further optical conductor for conducting said received scattered electromagnetic radiation back to said evaluation circuit.

22. The smoke detection system as defined in claim 21, wherein:

said scattering reception zone defines a backward-scattering reception zone extending at an angle of more than 90° to said predetermined direction.

23. The smoke detection system as defined in claim 18, wherein:

said means for emitting said electromagnetic radiation is capable of emitting said electromagnetic radiation at a plurality of different ranges of wavelength.

24. The smoke detection system as defined in claim 18, further including:

at least one third optical collimator for receiving forward-scattered electromagnetic radiation and defining a radiation reception zone extending at an angle of less than 5° to said predetermined direction and being substantially non-divergent;

said radiation reception zone intersecting said radiation zone within said measuring volume; and a further optical conductor for conducting said received forward-scattered electromagnetic radiation back to said evaluation circuit.

25. The smoke detection system as defined in claim 24, wherein:

said angle of less than 5° is substantially 0°.

26. The smoke detection system as defined in claim 18, wherein:

said means for emitting said electromagnetic radiation is capable of emitting said electromagnetic radiation in pulses.

27. The smoke detection system as defined in claim 18, wherein:

said evaluation circuit comprises a signal-processing circuit for comparing said electromagnetic radiation conducted back to said evaluation circuit with said electromagnetic radiation emitted by said means of said evaluation circuit for emitting electromagnetic radiation.

28. The smoke detection system as defined in claim 27, wherein:

said signal-processing circuit comprises a phase-sensitive amplifier.

29. The smoke detection system as defined in claim 28, wherein:

said phase-sensitive amplifier comprises a lock-in amplifier.

30. The smoke detection system as defined in claim 18, further including:

a radiation trap for terminating said radiation zone.

31. The smoke detection system as defined in claim 18, further including:

a radiation trap for terminating said forward-scattering reception zone.

32. A smoke detection system, comprising:

a scattered radiation smoke detector containing a measuring volume;

an evaluation circuit having means for emitting electromagnetic radiation and means for generating an alarm signal upon detecting a presence of smoke in said measuring volume;

at least one optical conductor pair connecting said evaluation circuit to said scattered radiation smoke detector;

said scattered radiation smoke detector comprising at least one first optical collimator for directing electromagnetic radiation into said measuring volume in a predetermined direction;

said at least one optical conductor pair comprising at least one optical transmission conductor for conducting said electromagnetic radiation from said means for emitting electromagnetic radiation to said at least one first optical collimator;

said scattered radiation smoke detector comprising at least one second optical collimator for receiving electromagnetic radiation forward-scattered from smoke within said measuring volume;

said at least one optical conductor pair comprising at least one optical reception conductor for conducting said received forward-scattered electromagnetic radiation back to said evaluation circuit;

said evaluation circuit comprising means for sensing and evaluating said electromagnetic radiation conducted back for determining a possible presence of smoke in said measuring volume;

said at least one first optical collimator defining a radiation zone having substantially the form of a conoid generated about an axis of revolution extending in said predetermined direction and substantially confined to a small thickness;

said at least one second optical collimator defining a forward-scattering reception zone having substantially the form of a conoid generated about an axis of revolution extending in said predetermined direction and substantially confined to a small thickness; and said forward-scattering reception zone intersecting said radiation zone in a substantially circular ring of small diameter within said measuring volume.

33. A scattered radiation smoke detector, comprising:

an electronic evaluation circuit;

a plurality of electromagnetic radiation conducting elements for connecting said electronic evaluation circuit to the smoke detector;

said electronic evaluation circuit comprising means for emitting electromagnetic radiation;

a measuring volume;

at least one first electromagnetic radiation conductor of said plurality of electromagnetic radiation conductors serving for radiating said electromagnetic radiation emitted by said means into said measuring volume;

at least one second electromagnetic radiation conducting element of said plurality of electromagnetic radiation conducting elements serving for receiving and conducting back to said electronic evaluation circuit electromagnetic radiation scattered by smoke particles in said measuring volume;

said at least one first electromagnetic radiation conducting element having an electromagnetic radiation exit end;

said at least one second electromagnetic radiation conducting element having an electromagnetic radiation entry end;

a respective optical arrangement at each of said electromagnetic radiation exit end and said electromagnetic radiation entry end;

each said optical arrangement comprising a radiation emission collimating device and a radiation reception collimating device;

each said optical arrangement defining an at least approximately non-divergent radiation zone of small cross-section and an at least approximately non-divergent reception zone of small cross-section; and said at least approximately non-divergent radiation zone and said at least approximately non-divergent reception zone of both said optical arrangements mutually intersecting in said measuring volume for generating said at least approximately non-divergent radiation zone with a small cross-section and said at least approximately non-divergent reception zone with a small cross-section.

34. The scattered radiation smoke detector as defined in claim 33, wherein:

said electromagnetic radiation emitted by said means is pulsed.

35. The scattered radiation smoke detector as defined in claim 33, wherein:

the scattered radiation smoke detector is connectable to said electronic evaluation circuit; and said electronic evaluation circuit comprising a coincidence circuit for comparing electromagnetic radiation received and electromagnetic radiation emitted by said means.

36. The scattered radiation smoke detector as defined in claim 35, wherein:

said coincidence circuit comprises a phase-sensitive amplifier.

37. The scattered radiation smoke detector as defined in claim 36, wherein:

said phase-sensitive amplifier comprises a lock-in amplifier.

38. The scattered radiation smoke detector as defined in claim 33, wherein:

said at least approximately non-divergent radiation zone of small cross-section is closed by a radiation trap.

39. The scattered radiation smoke detector as defined in claim 33, wherein:

said at least approximately non-divergent reception zone of small cross-section is closed by a radiation trap.

40. A smoke detection system, comprising:

a scattered radiation smoke detector containing a measuring volume;

an evaluation circuit having means for emitting electromagnetic radiation and means for generating an alarm signal upon detecting a presence of smoke in said measuring volume;

at least two optical conductor pairs connecting said evaluation circuit to said scattered radiation smoke detector;

said scattered radiation smoke detector comprising at least two first optical collimators for directing electromagnetic radiation into said measuring volume in a predetermined direction;

said at least two optical conductor pairs comprising at least two optical transmission conductors for conducting said electromagnetic radiation from said means for emitting electromagnetic radiation to each of said at least two first optical collimators;

said scattered radiation smoke detector comprising at least two second optical collimators for receiving electromagnetic radiation forward-scattered from smoke within said measuring volume;

said at least two optical conductor pairs comprising at least two optical reception conductors for conducting said received forward-scattered electromagnetic radiation back to said evaluation circuit;

said evaluation circuit comprising means for sensing and evaluating said electromagnetic radiation conducted back by each of said at least two optical reception conductors for determining a possible presence of smoke in said measuring volume;

said at least two first optical collimators defining at least two radiation zones each extending in said predetermined direction and being substantially non-divergent;

said at least two second optical collimators defining at least two forward-scattering reception zones each extending at an angle of less than 90° to said predetermined direction and being substantially non-divergent; and each forward-scattering reception zone of said at least two forward-scattering reception zones intersecting an associated one of said at least two radiation zones within said measuring volume.

* * * * *